United States Patent
Byron et al.

(10) Patent No.: US 10,720,071 B2
(45) Date of Patent: Jul. 21, 2020

(54) DYNAMIC IDENTIFICATION AND VALIDATION OF TEST QUESTIONS FROM A CORPUS

(71) Applicant: International Business Machines Corporation, Armonk, NY (US)

(72) Inventors: Donna K. Byron, Petersham, MA (US); Suzanne L. Estrada, Boca Raton, FL (US); Alexander Pikovsky, Lexington, MA (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 1622 days.

(21) Appl. No.: 14/139,456

(22) Filed: Dec. 23, 2013

(65) Prior Publication Data

US 2015/0179082 A1    Jun. 25, 2015

(51) Int. Cl.
*G09B 7/00* (2006.01)
(52) U.S. Cl.
CPC ..................... *G09B 7/00* (2013.01)
(58) Field of Classification Search
CPC ...... G09B 7/00; G06F 17/30654; G06F 17/27
USPC .............................. 434/118, 322, 362; 704/9
See application file for complete search history.

(56) References Cited

U.S. PATENT DOCUMENTS

| | | | |
|---|---|---|---|
| 6,431,875 B1 * | 8/2002 | Elliott | G09B 7/00 434/118 |
| 2006/0183099 A1 | 8/2006 | Feely et al. | |
| 2007/0129937 A1 | 6/2007 | Kellet et al. | |
| 2008/0026360 A1 | 1/2008 | Hull | |
| 2008/0195378 A1 * | 8/2008 | Nakazawa | G06F 17/30654 704/9 |
| 2009/0287678 A1 | 11/2009 | Brown et al. | |
| 2010/0081120 A1 | 4/2010 | Nanjiani et al. | |
| 2010/0203492 A1 | 8/2010 | Nibew et al. | |

(Continued)

FOREIGN PATENT DOCUMENTS

| | | |
|---|---|---|
| EP | 2575123 A1 | 3/2013 |
| JP | 2002318523 A | 10/2002 |

(Continued)

OTHER PUBLICATIONS

Byron, et al., "Adapting Tabular Data for Narration", filed Mar. 15, 2013, U.S. Appl. No. 13/838,130.

(Continued)

*Primary Examiner* — Eddy Saint-Vil
(74) *Attorney, Agent, or Firm* — Stephen J. Walder, Jr.; Reza Sarbakhsh

(57) ABSTRACT

Mechanisms for automatically generating a set of test questions for use in generating a test to be administered to human test takers are provided. The mechanisms ingest a document from a corpus of documents to select a potential test question answer from the document and generate a candidate test question based on the potential test question answer. The mechanisms evaluate the candidate test question using a Question and Answer (QA) system to generate a result indicative of whether the candidate test question should be maintained for test generation. The mechanisms store the candidate test question in the set of test questions in response to a result indicating that the candidate test question should be maintained for test generation.

20 Claims, 5 Drawing Sheets

(56) References Cited

U.S. PATENT DOCUMENTS

| | | | |
|---|---|---|---|
| 2011/0066587 A1 | 3/2011 | Ferrucci et al. | |
| 2011/0125734 A1 | 5/2011 | Duboue et al. | |
| 2011/0257961 A1 | 10/2011 | Tinkler et al. | |
| 2012/0244510 A1* | 9/2012 | Watkins, Jr. | G09B 7/00 434/362 |
| 2013/0007055 A1 | 1/2013 | Brown et al. | |
| 2013/0017524 A1 | 1/2013 | Barborak et al. | |
| 2013/0018652 A1 | 1/2013 | Ferrucci et al. | |
| 2013/0066886 A1 | 3/2013 | Bagchi et al. | |
| 2013/0084554 A1 | 4/2013 | Shah et al. | |
| 2014/0120513 A1* | 5/2014 | Jenkins | G06F 17/27 434/362 |
| 2015/0039536 A1 | 2/2015 | Cook et al. | |
| 2015/0120621 A1 | 4/2015 | Alkov et al. | |
| 2015/0178623 A1 | 6/2015 | Balani et al. | |
| 2015/0179082 A1 | 6/2015 | Byron et al. | |

FOREIGN PATENT DOCUMENTS

| | | |
|---|---|---|
| WO | WO 2010/049953 A2 | 5/2010 |
| WO | WO 02010/049953 A3 | 5/2010 |

OTHER PUBLICATIONS

Byron, et al., "Discovering Relationships in Tabular Data", filed Jul. 1, 2013, U.S. Appl. No. 13/932,435.
"Preparing Examination Papers and Preparing Students for Examinations: Guidance for Tutors", TLC: Teaching and Learning Center, Notes of Guidance Series-No. 3, May 2007, pp. 1-12 (6 total pages).
"Question Formation Enhancement", IPCOM000223766D, Nov. 28, 2012, 2 pages.
"Setting Examination Papers", Western Cape Education Department, FET NCS 2006, 18 pages.
Dimple, Paul V. et al., "Use of an Evolutionary Approach for Question Paper Template Generation", 2012 IEEE Fourth International Conference on Technology for Education, Jul. 18-20, 2012, 5 pages.
High, Rob, "The Era of Cognitive Systems: An Inside Look at IBM Watson and How it Works", IBM Corporation, Redbooks, 2012, 16 pages.
Paul, Dimple V. et al., "Dynamic Examination Question Paper Generation System", 17th International Conference on Management of Data (COMAD 2011), Dec. 19-21, 2011; http://www.cse.iitb.ac.in/~comad/2011/images/presentations/dec19/wip1/comad_presentation_new_today191211.pdf, 13 pages.
Pollitt, Alastair et al., "The Demands of Examination Syllabuses and Question Papers", http://tna.europarchive.org/20090618071203/http://www.ofqual.gov.uk/files/2007-comparability-exam-standards-g-chapter5.pdf; Book: "Techniques for Monitoring the Comparability of Examination Standards", Chapter 5, published 2007, 46 pages.
Rekha, R et al., "Ontology Driven Framework for Assessing the Syllabus Fairness of a Question Paper", 2012 IEEE International Conference on Technology Enhanced Education (ICTEE), Jan. 3-5, 2012, 5 pages.
Sharma, Shubham, "JEE MAIN Question Paper", http://engg.entrancecorner.com/exams/6487-jee-main-question-paper.html; Apr. 19, 2013, 3 pages.
Yuan, Michael J., "Watson and healthcare, How natural language processing and semantic search could revolutionize clinical decision support", IBM developerWorks, IBM Corporation, Apr. 12, 2011, 14 pages.
USPTO U.S. Appl. No. 14/867,160.
USPTO U.S. Appl. No. 14/146,583.

* cited by examiner

DYNAMIC IDENTIFICATION AND VALIDATION OF TEST QUESTIONS FROM A CORPUS

BACKGROUND

The present application relates generally to an improved data processing apparatus and method and more specifically to mechanisms for performing dynamic identification and validation of test questions from a corpus.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for automatically generating a set of test questions for use in generating a test to be administered to human test takers. The method comprises ingesting, by the data processing system, a document from a corpus of documents to select a potential test question answer from the document and generating, by the data processing system, a candidate test question based on the potential test question answer. The method further comprises evaluating, by the data processing system, the candidate test question using a Question and Answer (QA) system to generate a result indicative of whether the candidate test question should be maintained for test generation. The method also comprises storing, by the data processing system, the candidate test question in the set of test questions in response to a result indicating that the candidate test question should be maintained for test generation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
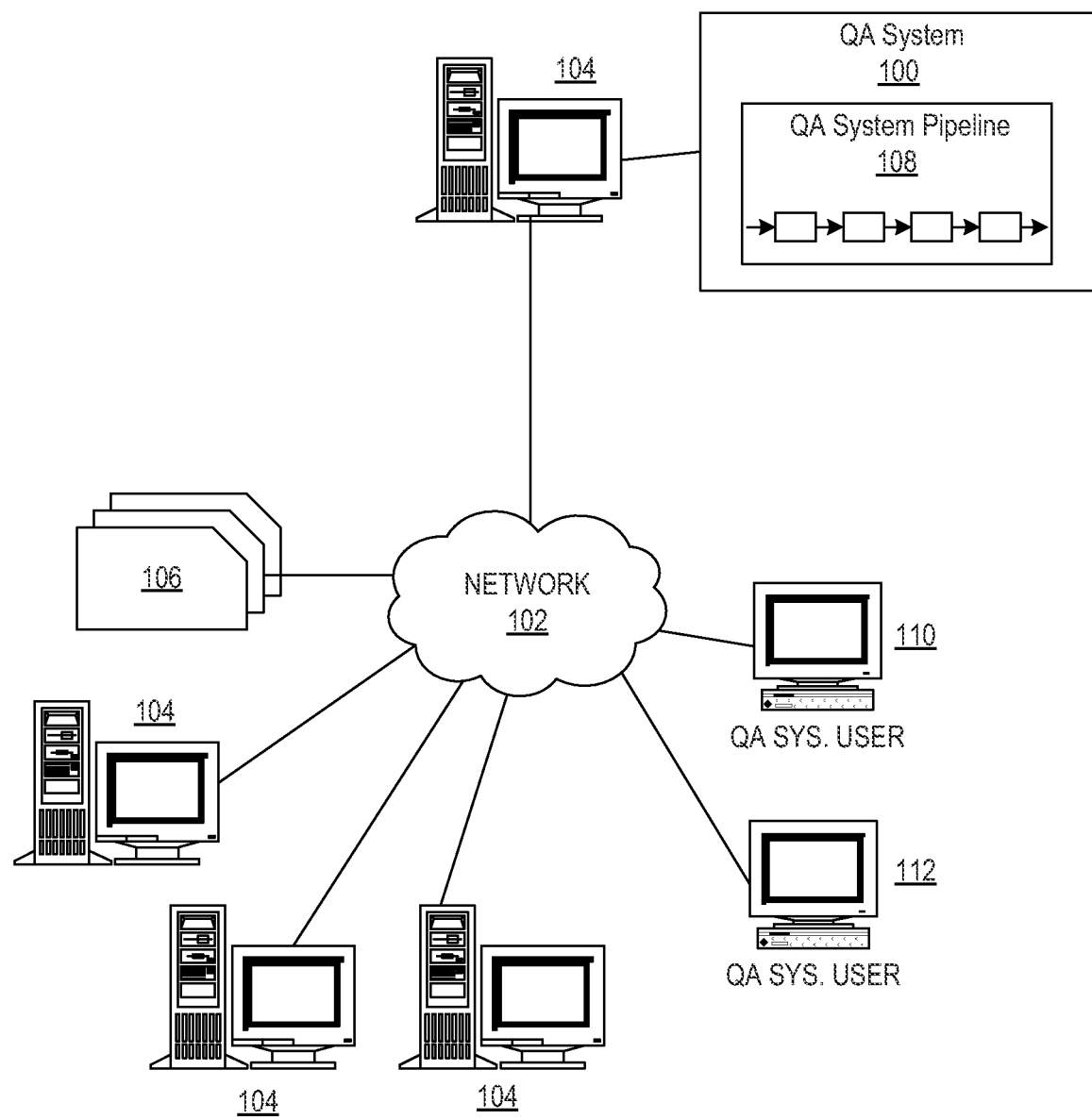
FIG. 1 depicts a schematic diagram of one illustrative embodiment of a question/answer creation (QA) system in a computer network.

The illustrative embodiments provide mechanisms for dynamically generating and validating test questions from a corpus using a natural language processing system, such as a Question and Answer (QA) system. The illustrative embodiments not only generate the test questions that are candidates to test the knowledge and/or abilities of students with regard to the subject matter covered by a corpus of documents, but also provides mechanisms for evaluating these generated questions to thereby eliminate badly formed questions that should not be presented to the student or are unlikely to result in a student providing a correct answer to the posed test question. A QA system may be augmented to be an evaluator for synthetically generated questions generated using the mechanisms of the illustrative embodiments.

Exams and quizzes are commonly used to assess whether learners have mastered a subject or have a complete understanding of a particular subject matter or domain of knowledge. In some cases, tests are prepared through creation of a set of questions that are provided to instructors along with an instructional text. Automatic question generation would enable exams and quizzes to be produced faster and with greater coverage of the subject matter. Automatic generation of questions would also allow questions to be created from document collections that are not organized into pedagogical, i.e. academic, education, or instructional, material and which are to be used in test scenarios outside the classroom, such as for testing employees on their knowledge of corporate policies or product specifications.

Current automated mechanisms for generating tests/quizzes are limited to selecting questions from an already existing set of test questions that were generated manually and placed in a database. That is, a set of questions may be provided along with the instructional material and the automated aspect of test/quiz generation is limited to simply selecting a subset of questions from the already provided set of questions. This requires much effort and expense on the part of the provider of the instructional material to generate the set of questions prior to distributing the instructional material and question set. Furthermore, such automated mechanisms are static and limited to the original set of questions provided. There is no ability to dynamically generate new questions to be added to the set of questions, or dynamically generate a completely new set of questions, based on the instructional material or changes to the instructional material.

The illustrative embodiments provide mechanisms for automatically and dynamically generating such questions which may then be used in exams and quizzes to test the knowledge and ability of students or other test/quiz takers. With the mechanisms of the illustrative embodiments, the documents of a corpus are analyzed using natural language processing (NLP) mechanisms to extract named entities and factual relationships between entities that are relevant to the domain, sub-domain, or the like, of the document. These named entities and factual relationships are indicative of target answers to questions. Thus, questions may be generated for which these named entities and factual relationships are the answers.

A plurality of natural language processing techniques may be used to synthesize proposed question variants intended to evoke the target answer from a human test/quiz taker, based on the identified named entities, factual relationships, or other candidate answers extracted from the documents of the corpus. Through the use of these various techniques, a plurality of question variants are constructed. The question variants may be submitted to a QA system which evaluates the various question variants based on whether the processing of the question variant generates an intended candidate answer and the level of confidence with which the intended candidate answer is generated. Question variants that cause the QA system to produce the intended candidate answer with a sufficiently high enough confidence measure are considered to be good test question candidates. Malformed, or poorly worded, questions are not likely to produce the intended candidate answer and thus, will be automatically filtered out by the application of the QA system to evaluate the question variants.

After evaluating the question variants, a set of candidate test questions for generating tests/quizzes is output. A test/quiz generation engine may compile subsets of these candidate test questions into one or more tests or quizzes to be administered to students or other test/quiz takers.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereo.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
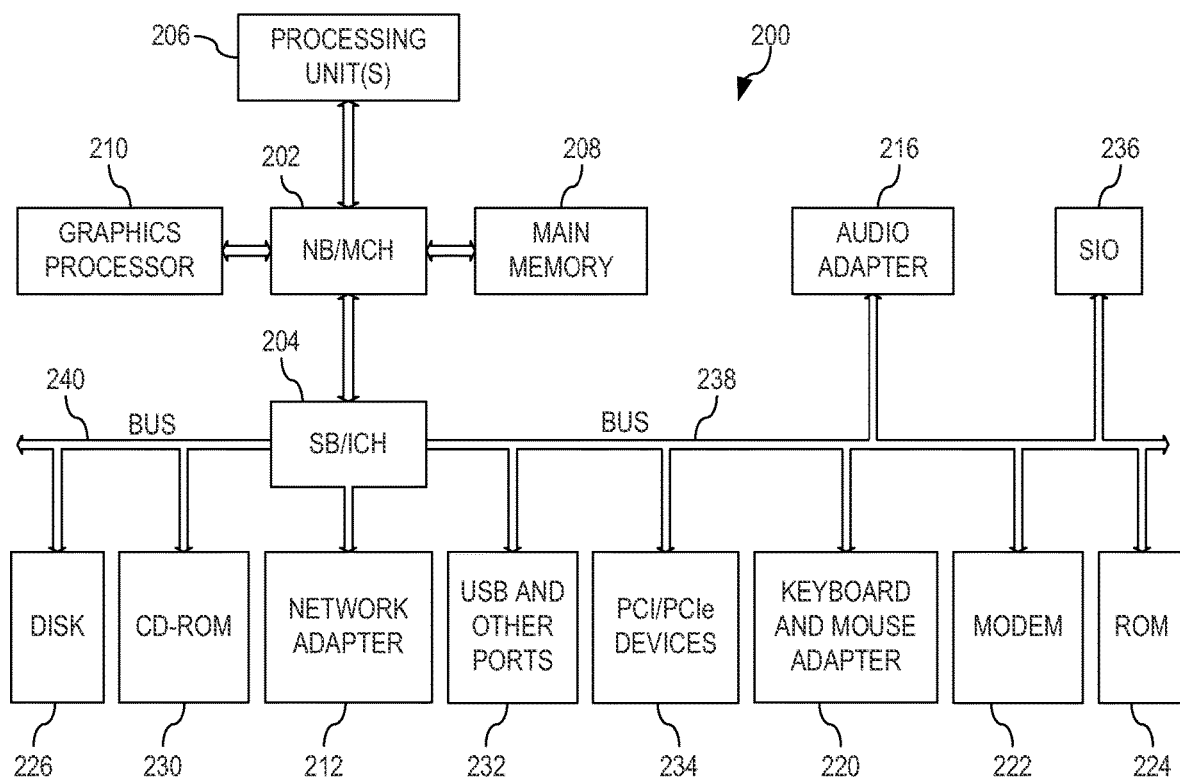
FIG. 2 is a block diagram of an example data processing system in which aspects of the illustrative embodiments may be implemented.
Figure 3:
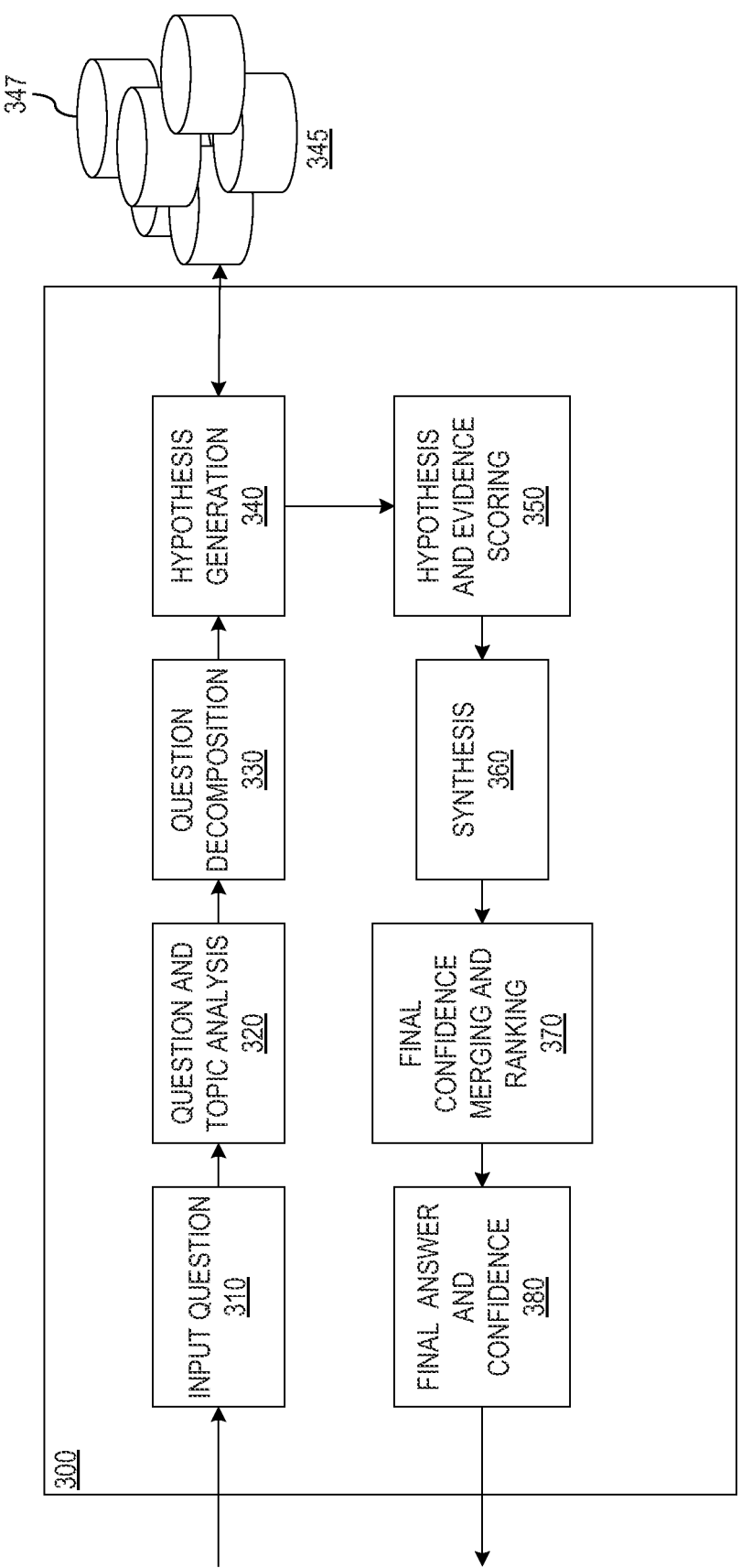
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatic test question generation and evaluation for automatically generating a set of candidate questions that can be used to test the knowledge and/or abilities of students with regard to a domain of subject matter covered by documents in one or more corpora of documents.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be a different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 540, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

The illustrative embodiments provide mechanisms for utilizing a QA system, such as described above with regard to FIGS. 1-3, to evaluate question variants generated from documents in a corpus or corpora. Thus, with the mechanisms of the illustrative embodiments, documents of a corpus/corpora are ingested using a natural language processing (NLP) engine that is configured to extract portions of content directed to entities and factual relationships within the documents of the corpus or corpora. These portions of content are processed to generate test question answers that are representative or associated with the subject matter or domain of the document(s) from which the test question answer is obtained.

The test question answers are provided to a question generation engine that analyzes the test question answers and generates a plurality of candidate questions and question variants based on these portions of content. The resulting candidate questions and question variants are input to one or more QA system pipelines of the QA system for evaluation. The QA system pipelines perform the question processing described above on the input candidate question/question variant and generates a set of candidate answers to the input question/question variant, if possible. In some cases, if the candidate question/question variant is poorly formed, the candidate question/question variant may not be able to be parsed or may not otherwise be able to be processed by the QA system pipeline, in which case it is eliminated from consideration for inclusion in a set of questions for test/quiz purposes.

Assuming that the candidate question/question variant is able to be parsed and processed by the QA system pipeline, the QA system pipeline compares the generated candidate answers to the original test question answers generated from the portions of the content obtained from the documents in the corpus. If a candidate answer is generated that matches the original test question answer for the question/question variant, then the level of confidence associated with the candidate answer is compared to a threshold value to determine whether the candidate question/question variant generated the correct matching candidate answer with sufficient confidence to indicate that the candidate question/question variant is a good candidate for inclusion in the set of questions to be used to generate tests/quizzes for testing the knowledge/abilities of students or other test takers. If the level of confidence associated with the candidate answer is sufficiently high, e.g., equals or exceeds the threshold value, then the candidate question/question variant is added to the set of questions for use in generating tests/quizzes.

Figure 4:
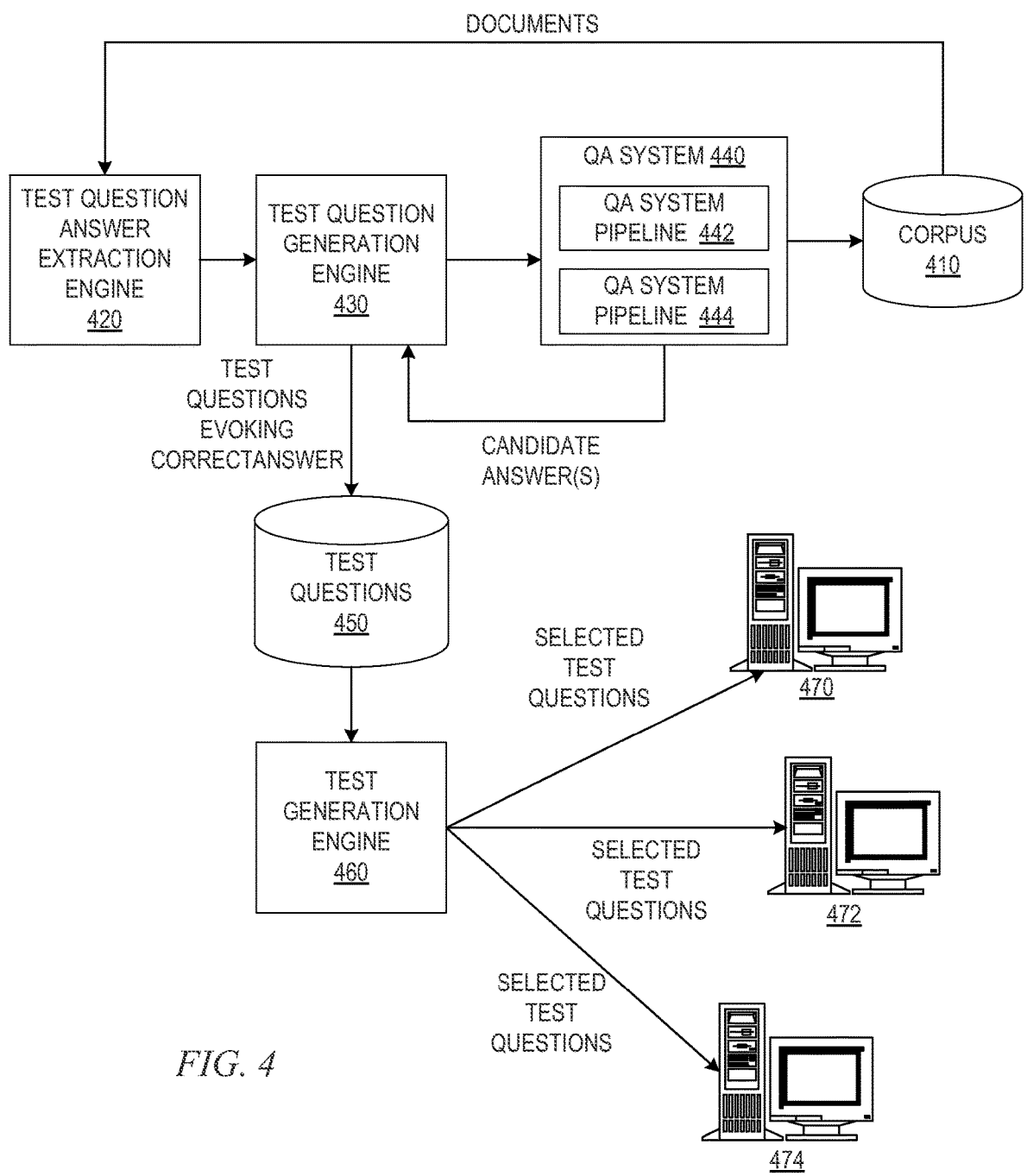
FIG. 4 is a block diagram illustrating the primary operational elements of a test/quiz generation mechanism in accordance with one illustrative embodiment.

FIG. 4 is a block diagram illustrating the primary operational elements of a test/quiz generation mechanism in accordance with one illustrative embodiment. The elements shown in FIG. 4 may be implemented in one or more data processing systems or computing devices, such as one or more servers, client computing devices, network attached storage systems/devices, or the like. The elements shown in FIG. 4 may be implemented in hardware, software executed on one or more data processing devices, or any combination of hardware and software.

As shown in FIG. 4, the primary operational elements comprise a corpus 410, which may be part of a larger corpora (not shown), containing a plurality of natural language documents. In one illustrative embodiment, the natural language documents are all directed to a similar domain or subject matter. For example, the natural language documents may be directed to an area of study, such as Engineering, Accounting, Human Physiology, or any of a plethora of other domains or subject matter areas for which tests/quizzes may need to be generated. It should be appreciated that the corpus 410 is not limited to storing instructional materials or documents and instead may comprise documents of a more general nature or distributed outside of an educational or instructional environment.

The documents in the corpus 410 are ingested by a test question answer extraction engine 420 which applies natural language processing (NLP) techniques to the content of the documents to extract portions of the content that are potential answers to test questions. Various techniques and logic may be applied to the content to extract such portions of content and generating candidate test question answers. These various techniques may look at parts of speech, lexical answer types, focus, or any of a variety of other natural language characteristics of statements in the documents so as to identify statements that are pertinent to the domain or subject matter of the document and further are indicative of named entities or factual relations that are relevant to the domain or subject matter. Format characteristics may further be evaluated to determine candidate test question answers including, for example, highlighted terms within the document, frequently indexed terms that appear in the document, correlations between text and section headers or document titles, or the like.

In some illustrative embodiments, one or more documents in the corpus 410 may comprise table structures in the content of the document which may be analyzed to identify factual relationships and named entities. For example, in some illustrative embodiments, the test question answer extraction engine 420 may analyze the headings of the columns/rows of the table structure, their functional relationships, and dependencies between portions of the table structure, to extract named entities and functional relationships indicative of answers to test questions. An example of a mechanism that may be used to extract relationships from table structures in natural language documents is described in co-pending and commonly assigned U.S. patent application Ser. Nos. 13/838,130 and 13/932,435, which are incorporated herein by reference.

Each of the candidate test question answers may be obtained from a single document in the corpus 410 or may be obtained from correlating named entities and factual relationships extracted from a plurality of documents in the corpus 410. That is, the entire corpus 410 may be ingested by the test question answer extraction engine 420 as input. For example, in a similar manner as the QA system 440 uses to generate candidate answers to an input question, the test question answer extraction engine 420 may generate various hypotheses and use evidence passages in other documents to verify the hypotheses. Factual relationships and named entities may be identified through hypothesis and evidence passages extracted from multiple documents of the corpus 410 ingested by the test question answer extraction engine 420. The actual extraction of candidate test question answers may be done using any of a plethora of techniques including obtaining user input specifying the candidate test question answers, selecting candidate test question answers from frequently indexed terms, from terms highlighted in the text such as through their inclusion in section or document headers, or the like.

The test question answer extraction engine 420 extracts the portions of content from the documents of the corpus 410 and identifies potential test question answers based on the extracted portions of content. For example, from the extracted portions of content, a subset of the portions of content is selected as a set of potential test question answers. The selection of the subset may be based on a determined measure of confidence in the portion of content being indicative of the domain or subject matter of the corpus 410 for which test questions are to be generated.

The potential test question answers are input to the test question generation engine 430. The test question generation engine 430 generates candidate test questions/question variants based on the potential test question answers. The test question generation engine 430 utilizes a plurality of techniques from natural language processing (NLP) to synthesize proposed test questions/question variants intended to evoke the potential test question answer from a human test taker. Information about the potential test question answer is retrieved from the corpus 410 in the form of related passages, e.g., evidence passages. These related passages may be found, for example, via a term index, such as the Indri term index, or the like. Questions about the potential test question answers are composed by combining information found in multiple passages from one or more documents of the corpus 410.

The test question generation engine 430 is capable of outputting multiple candidate test questions/question variants. The test question may be generated from the potential test question answers using templates, question generation rules, or the like, based on characteristics of the potential test question answers. For example, if the potential test question answer is a name of a person, the evidence passages related to the potential test question answer may be mined for information indicating relationships between the person and other facts. Take as an example, a document from a corpus 410 dealing with American government in which the subject matter of the document is the Presidents of the United States of America. The document may indicate that Benjamin Harrison was the 23 president and was president between the years of 1889-1893. Having identified Benjamin Harrison as the potential test question answer, test questions of "who was the 23$^{rd}$ president of the United States of America" and "Who was the president of the United States of America during 1889-1893?" may be generated based on the identified factual relationships. Moreover, with the mechanisms of the illustrative embodiments, variations of these questions may likewise be generated including, for example, "Who was the 23$^{rd}$ President?", "The 23$^{rd}$ President of the United States was whom?" "Name the 23$^{rd}$ President", and the like. Moreover, other portions of the same or different documents may identify additional factual relations and/or combinations of factual relations, associated with the potential test question answer, e.g., "Benjamin Harrison", such that additional candidate test questions are generated, e.g., "Who was governor of Indiana, a brigadier general during the Civil War, and eventually become President of the United States?" or "Who was President when annual federal spending first reached one billion dollars?" or "Who was President when the Sherman Antitrust Act was passed?" Various rules, templates, and logic may be used to implement a series of operations for converting a potential test question answer into a candidate test question that is formed to evoke the potential test question answer.

The test question generation engine 430 generates multiple candidate test questions with variations in selected content or surface realization, for a given potential test question answer. The candidate test questions and variations may be stored in association with the potential test question answer with which they are associated in test question/answer correlation storage 435 for later evaluation of the candidate test questions/variants. For example, as described hereafter, the candidate test questions/variants may be used to generate candidate answers to these questions and the candidate answers may be compared against the potential test question answer to determine if there is a match.

Once the candidate test questions and their variants are generated by the test question generation engine 430, the candidate test questions and their variants are passed to the QA system 440 for processing. The QA system 440 takes each of the candidate test questions and their variants as input questions to one or more QA system pipelines 442-444 for processing using the corpus of documents 410. While FIG. 4 shows the corpus 410 being used to evaluate the candidate test questions, it should be appreciated that the present invention is not limited to using the same corpus 410 that was used to generate the potential test question answers by the test question answer extraction engine 420. To the contrary, a different corpus may be used without departing from the spirit and scope of the illustrative embodiments. For example, the corpus 410 may be a subset of a corpora (not shown) and instead of using the corpus 410 for evaluating the candidate test questions and their variants, the entire corpora may be utilized. Alternatively, the documents used to generate the potential test question answers may be a subset of the corpus 410 with the entire corpus 410 being utilized to evaluate the candidate test questions and their variants.

The QA system 440 operates in the manner previous described above but with regard to the candidate test questions and variants generated by the test question generation engine 430. In so doing, some automatically generated candidate test questions/variants may be poorly worded or malformed by the automated mechanisms. As a result, the QA system 440 may not be able to satisfactorily parse and analyze the candidate test question/variant. For example, if the question is ungrammatical, the parsing stage of the QA system 440 will fail. However, if the question is grammatical, but the question is phrased in such a way that the QA system is unable to clearly identify a focus of the question, a lexical answer type of the question, or any other important characteristics of the question needed to generate candidate answers, then the question may fail during the parsing stage of the QA system 440. For example, the question "How is Darwin's study about evolution?" is a grammatical question with poor phrasing that does not indicate the question's focus. Such poorly worded or malformed questions may be immediately discarded from further consideration by the QA system 440 and will result in the QA system 440 not performing its further operations for generating candidate answers for the input question.

The QA system 440 generates candidate answers to the candidate test questions/variants and further generates measures of confidence associated with the candidate answers. The candidate answers may be returned by the QA system 440 to the test question generation engine 430 for further evaluation. The candidate answers may be returned as a ranked listing of candidate answers associated with each candidate test question/variation submitted to the QA system 440, may comprise only the highest ranked candidate answer or a final candidate answer selected by the QA system 440 for each of the candidate test questions/variations, or the like.

The candidate answers received by the test question generation engine 430 from the QA system 440 may be compared to the potential test question answer extracted by the test question answer extraction engine 420 and from which the candidate test question/variation was generated to determine if there is a match. That is, the information stored in the test question/answer correlation storage 435 may be used to identify the potential test question answer associated with the candidate test question/variant that was submitted to the QA system 440 and for which the candidate answer(s) were generated. The candidate answer(s) may be compared to the potential test question answer to determine if there is a match. The match need not be an exact match and logic may be provided in the test question generation engine 430 to determine a degree of matching and whether that degree of matching is sufficient to indicate that the candidate answer and the potential test question answer are indeed a match with one another even though some variations may exist within a given tolerance.

If there is a match between a candidate answer and the potential test question answer, then the measure of confidence associated with the candidate answer may be compared against a threshold confidence value. The threshold confidence value is a user tunable value that is indicative of the level of confidence required for a conclusion that the candidate test question/variant is a good test question, i.e. a test question that is likely to evoke the potential test question answer based on the content of the documents in the corpus 410 or other corpus/corpora used to evaluate the candidate test question/variant. If the measure of confidence is equal to or greater than the threshold confidence value, then the candidate test question/variant is considered a good test question/variant to be included in a set of test questions for the particular domain/subject matter associated with the corpus 410. If the measure of confidence is not equal to or greater than the threshold confidence value, then the candidate test question/variant is not a good test question/variant and may be discarded or otherwise not included in the set of test questions. In some illustrative embodiments, if a candidate test question/variant generates a matching candidate answer that has a measure of confidence that is within a tolerance but below the threshold confidence value, a notification can be sent to a user of this situation with an option to allow the user to override the operation of the automated system and include the candidate test question/variant in the set of test questions even though the required threshold measure of confidence was not met. The tolerance value is again a user definable or otherwise customizable value that may be set according to the desired implementation.

For example, assume that the potential test question answer is "Darwin's Study on Evolution." A badly formed candidate test question may be of the type "What did Darwin study how evolve?" In such a case, the QA system is unable to answer this question because of the badly formed nature of the question and the evaluation of the candidate test question fails in the QA system parsing stage. A good candidate test question may be of the type "What is Darwin's study?" with the QA system identifying the correct answer with a high confidence, i.e. "Darwin's Study on Evolution" or simply "Evolution." Another good candidate test question may be of the type "Did Darwin study evolution?" with the QA system coming up with the correct answer, i.e. "yes", from the corpus of documents 410.

In some illustrative embodiments, the results generated for each of the test questions and their variants, associated with the same potential test question answer, may be compared with one another to select one or more of the test questions and their variants as the test questions and variants to be included in the resulting set of test questions. For example, multiple test questions/variants for the same potential test question answer may be submitted to the QA system 440 which generates candidate answers for these multiple test questions/variants. Those that have matching candidate answers to the potential test question answer may then be identified and those within this set that have confidence measures that meet the threshold confidence value may be selected. From this subset of candidate test questions/variants, the one or ones that have the highest confidence measures associated with the matching candidate answer may be selected for inclusion in the set of test questions.

Each of the candidate test questions/variants for each of the potential test question answers that are selected for inclusion in the set of test questions may be stored in the test question set storage 450 in association with the potential test question answer with which they are associated. The test question set storage 450 provides the set of test questions from which a user or automated tool may select questions for inclusion in a test or quiz to be administered to students or other test takers. That is, the test question set in the test question set storage 450 may be provided as input to the test generation engine 460 which may automatically, or semi-automatically, compile a test/quiz comprising a plurality of test questions selected from the test question set. The particular manner by which to select questions from the test question set is implementation specific and various criteria may be used. For example, a random sampling of test questions from the test question set may be utilized. A pseudorandom selection of test questions from the test question set may be used in which consideration is made so as to not select more than one question associated with the same test question answer. A weighted selection such that a certain number of questions are selected from each of the various domains, sub-domains, or subject matter areas are selected, e.g., 20% of the questions from American political history, 30% of the questions from presidential history, and 50% from American government in general. Any manner of selecting test questions from a test question set in either a manual, automatic, or semi-automatic manner may be used without departing from the spirit and scope of the illustrative embodiments. The resulting selected test questions are compiled into a test/quiz which may then be output in a physical form, e.g., printed or otherwise made into a physical article for distribution, or may be distributed in an electronic form to test taker computing devices 470-474.

Thus, the illustrative embodiments provide mechanisms for performing automatic test question generation from a corpus of information as well as evaluating the test question and variants of the test question to select those that are likely to evoke the correct answer. The selected set of automatically generated test questions and variants may be used to select a subset of these questions for inclusion as a test or quiz to be administered to one or more test takers.

To further illustrate the operation of the illustrative embodiments, consider the following example text from a finance document, which might be used to develop training materials/tests for new employees of an organization in accounting roles:

An ICA is a written agreement used by company locations to order goods or services from related companies, when other formal ordering procedures do not exist. The ICA acts as a purchase order, a contract and a legal document for the transactions.

Further consider this portion of text being associated with a page title of "ICA". This portion of content may be ingested by the mechanisms of the illustrative embodiments in the following manner.

Because the term "ICA" is a page title, and is the subject of the first two sentences on the page, the test question answer extraction engine 420 selects this term as a term that a student should learn and be tested about. Thus, "ICA" is selected as a potential test question answer from which one or more candidate test questions may be generated along with their variations.

In order to generate the candidate test questions and variants, the test question generation engine 430 gathers evidence passages from the corpus, e.g., sentences, phrases, portions of tables, and the like, for which "ICA" is a clausal subject within the evidence passages. Additional filtering of these evidence passages to ensure that they are directed to the same domain/subject matter as the potential test question answer, e.g., accounting, may be implemented. This may be accomplished by judging document similarity between the selected page on which ICA is the title and other documents containing evidence passages having ICA as a clausal subject.

From these evidence passages, the test question generation engine 430 extracts processing artifacts or characteristics that provide both syntactic and semantic information about the potential test question answer. For example, with regard to "ICA" the following characteristic information may be extracted from the evidence passages indicating the factual relationships between the potential test question answer and other entities:

ICA is an abbreviation for Inter Company Agreement
ICA is a written agreement
ICA is used to order goods or services
ICA is used to order from related companies
ICA acts as a purchase order for transactions
ICA acts as a contract for transactions
ICA acts as a legal document for transactions ICA has singular number (because of the frame "an ICA is" as opposed to "ICA are").

Having identified the characteristic and factual relationships between the named entities in the potential test question answer and other entities, the test question generation engine 430 selects one or more of these characteristics/factual relationships for use in generating a candidate test question. The selection of which characteristics/factual relationships to include in the test question, and the number of such characteristics/factual relationships may be implemented in the particular logic of the test question generation engine 430 for the particular selected embodiment. For example, this selection may be hard-coded based on the desired difficulty level of a question and may be tuned differently for different types of questions. For example, based on whether the question requires a multiple choice, true/false, or a descriptive answer, the number and types of characteristics/factual relationships included in the candidate test question may be selected.

The test question generation engine 430 then performs surface realization on the selected characteristics/factual relationships to generated grammatically correct questions for a chosen output language. Surface realization mechanisms fall within three primary categories: harvesting from human examples, generation via grammar rules as provided by natural language grammar engines such as simpleNLG, FUF/SURGE, and openCCG, or through template specifications. Any one or more of these types of surface realization mechanisms may be used to generate grammatically correct natural language questions from the selected characteristics/factual relationships. Some techniques may produce questions that are awkward or not well formed, however low quality questions will be culled via processing by the QA system as it processes the questions for evaluation. An example of generating one possible surface realization using the simpleNLG toolkit (a grammar-based method) is:

```
Question 1: "Is ICA a type of written agreement?"
NPPhraseSpec target = new NPPhraseSpec(getString(ICA));
    (where the getString function is able to produce
    variations, such as "ICA" or "Intercompany Agreement" as
    needed)
p.setSubject(target);
p.setVerb("Is");
NPPhraseSpec obj = new NPPhraseSpec(getString(ICA));
obj.addModifier("written");
p.add(Complelment(obj);
p.setinterrogative(InterrogativeType.YES_NO);
realiser.realiseSentence(p);
Question 2: "True or False: An ICA cannot be used as a
contract."
NPPhraseSpec target = new NPPhraseSpec(getString(ICA));
Target.setDeterminer("an");
p.setSubject(target);
VPPhraseSpec pred = new VPPhraseSpec("use as");
p.setFeature(passive, true);
p.setModal(can);
NPPhraseSpec obj = new NPPhraseSpec("contract");
obj.setDeterminer("a");
p.setObject(obj);
p.setNegated(TRUE);
realiser.realiseSentence(p);
```

An alternative method for generating Question 1 above using templates may be of the following type:

```
Public void String askDefintion(Object concept) {
    Object supertype = concept.getHypernym( ); (finds ICA isa written
agreement)
    ArrayList<String> questions = new ArrayList<String>( );
    questions.add("Is" + getString(concept) + "a kind of" +
    getString(supertype));
    questions.add("Is" + getString(concept) + "a type of" +
getString(supertype));
    questions.add("Can" + getString(concept) +
"be considered a kind of" + getString(supertype));
    questions.add("Would you define" + getString(concept) +
"as a kind of" + getString(sueprtype));
```

As discussed above, the questions generated using the potential test question answer and surface realization using evidence passages from the same or other documents or portions of content in a corpus, may be submitted to a QA system for evaluation. Malformed questions are filtered out by the QA system due to the inability to parse or process the questions to generate meaningful question characteristics or components needed to perform the QA system operations. Questions that are not likely to evoke the correct answer, i.e. an answer matching the potential test question answer, are likewise filtered out by determining a level of confidence in candidate answers generated by the QA system and the requirement of a minimum threshold level of confidence for a matching candidate answer. Thus, only questions and their variants that are likely to evoke the correct answer are selected for inclusion in the set of test questions from which a test or quiz generating engine 460 may select questions for administering to a test taker. Furthermore, using a natural language generation (NLG) tool, such as OpenCCG, questions may actually be generated in a different human language than that of the original corpus and the illustrative embodiments may filter out questions in languages that are different from that used by the corpus and instead use a corresponding variant that is in the language used by the corpus.

Figure 5:
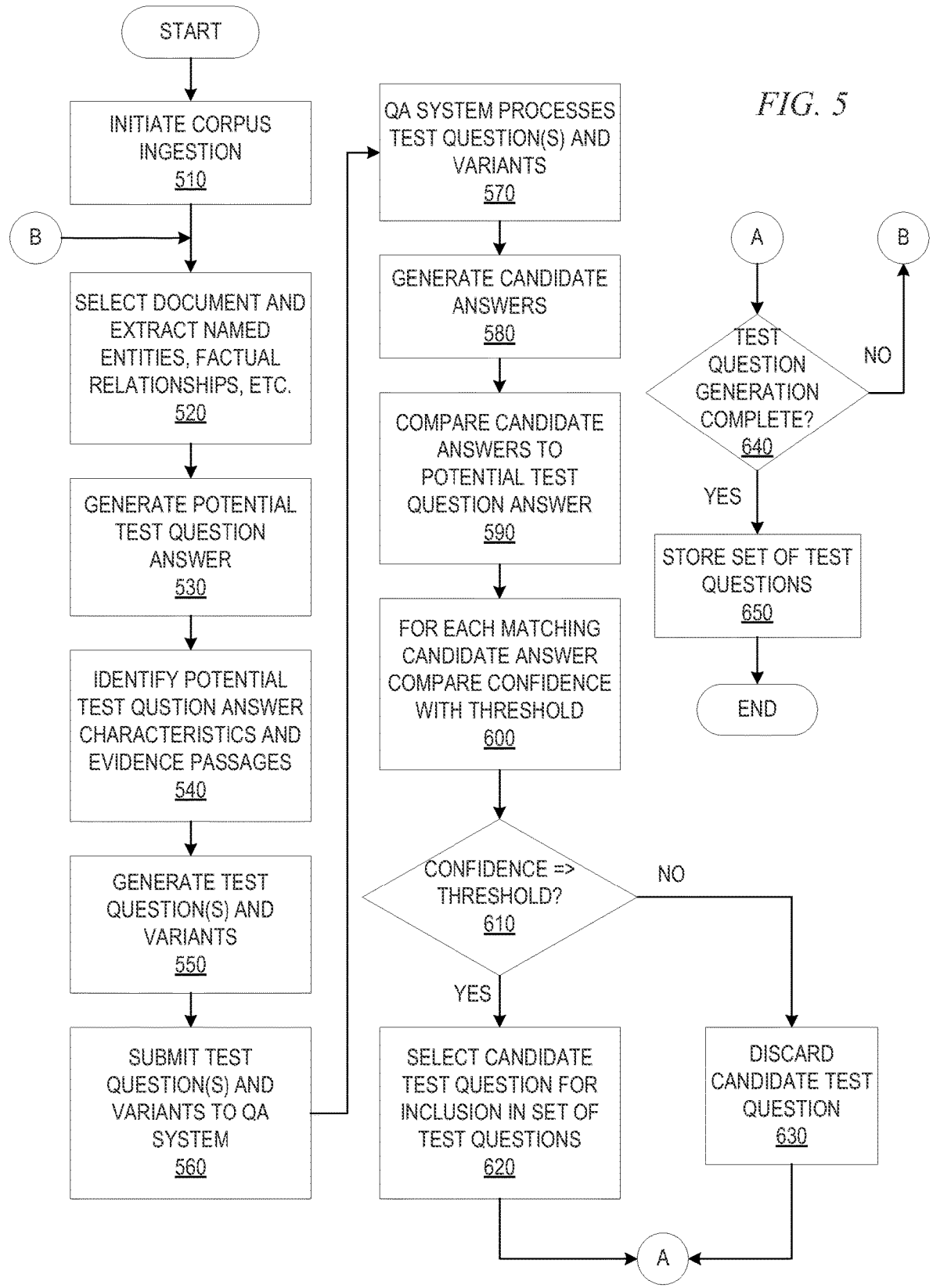
FIG. 5 is a flowchart outlining an example operation for performing automatic test question generation in accordance with one illustrative embodiment.

FIG. 5 is a flowchart outlining an example operation for performing automatic test question generation in accordance with one illustrative embodiment. As shown in FIG. 5, the operation starts by initiating a corpus ingestion operation (step 510). A document in the corpus is selected and named entities, factual relationships, and the like, are extracted from the document (step 520). A potential test question answer is generated from the named entities, factual relationships, and the like (step 530). Evidence passages from the document and/or other documents in the corpus are found that reference the potential test question answer and characteristics, factual relationships, and the like, about the potential test question answer are identified (step 540). Based on the characteristics, factual relationships, and the like, one or more candidate test questions and variants of the one or more test questions are generated for which the potential test question answer is an answer (step 550).

The one or more candidate test questions and variants are submitted to a Question and Answer (QA) system for evaluation (step 560). The QA system processes the one or more candidate test questions and variants with regard to a corpus or corpora (step 570). As noted above, as part of this processing, malformed or poorly worded questions are filtered out automatically due to these questions not being able to be parsed or processed to generate the characteristics required for generation of queries by the QA system.

The QA system receives candidate answers in response to the QA system processing the one or more candidate test questions and variants (step 580). The candidate answers are compared against the potential test question answer to determine if there is a match (step 590). For each matching candidate answer, the level of confidence of the candidate answer is compared to a threshold level of confidence required for identification of good test questions (step 600). A determination is made for each of the matching candidate answers as to whether the level of confidence is equal to or greater than the threshold (step 610). If so, then the candidate test question is selected for inclusion in the set of test questions (step 620). If the level of confidence is not equal to or greater than the threshold, then the candidate test question is discarded (step 630). In one illustrative embodiment, rather than discarding the candidate test question, if the level of confidence of the matching candidate answer is within a given tolerance of the required threshold level of confidence, then a notification may be sent to a user to request the user to indicate whether the candidate test question or variant should be added to the set of test questions or not. If the user selects to add the candidate test question or variant to the set of test questions, then it would be added; otherwise the candidate test question or variant is discarded.

A determination is made as to whether test question generation is complete (step 640). This determination may be based on whether all of the documents of the corpus have been processed to extract candidate test questions and variants, a determination that a predetermined number of test questions have been added to the set of test questions, or any other stopping criteria suitable to the particular implementation. If the test question generation is not complete, the next document in the corpus may be selected and the processing repeated (step 520). If the test question generation has completed, then the set of test questions is stored for later use in generating tests/quizzes to be administered to test takers (step 650). The operation then terminates. It should be appreciated that while FIG. 5 illustrates the operation terminating, based on the set of test questions generated by the mechanisms of the illustrative embodiments, test generation engines may utilize the set of test questions to select test questions from the set of test questions for inclusion in a test or quiz that is administered to test takers either through physical reproduction of the test questions on a physical article or through electronic transmission of the test/quiz to one or more test taker computing devices.

It should be appreciated that while the above illustrative embodiments are described in terms of a type of "batch mode" question generation, the illustrative embodiments are not limited to such. Rather, the illustrative embodiments may operate in an "on-demand" mode in which a user interested in obtaining questions for generation of a test may send an on-demand request to the system to request that one or more additional questions be generated and presented to the user. This may be done, for example, by a user when the user is compiling a test to be administered to other human beings, or may be used by a test taker during a runtime operation as the test taker is taking the test, such as by selecting a "next question" option in a user interface. Other embodiments in which the questions are generated in a dynamic manner or in an on-demand manner may be used without departing from the spirit and scope of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for automatically generating a set of test questions for use in generating a test to be administered to human test takers, the method comprising:

ingesting, by test question answer extraction engine logic executing on one or more processors in the data processing system, a document from a corpus of documents to select a potential test question answer from the document;

generating, by test question generation engine logic executing on the one or more processors in the data processing system, a candidate test question based on the potential test question answer;

evaluating, by a Question and Answer (QA) system, the candidate test question to generate a result indicative of whether the candidate test question should be maintained for test generation;

storing, by the data processing system, the candidate test question in the set of test questions in response to a result indicating that the candidate test question should be maintained for test generation; and transmitting, by test generation engine logic executing on the one or more processors in the data processing system, to at least one other computing device, the set of test questions to administer the test to at least one human test taker via the at least one other computing device.

2. The method of claim 1, wherein evaluating the candidate test question using the QA system comprises:

inputting, by the data processing system, the candidate test question to the QA system;

processing the candidate test question by the QA system to generate a candidate answer to the candidate test question;

determining, by the data processing system, if the candidate answer matches the potential test question answer; and generating an output result based on the result of the determining.

3. The method of claim 2, wherein the output result indicates that the candidate test question should be maintained for test generation in response to the candidate answer matching the potential test question answer.

4. The method of claim 2, wherein evaluating the candidate test question using the QA system further comprises:
in response to determining that the candidate answer matches the potential test question answer, determining if a confidence measure generated by the QA system for the candidate answer is equal to or greater than a threshold confidence measure; and
in response to the confidence measure being equal to or greater than the threshold confidence measure, generating the output result comprises outputting an output result indicating that the candidate test question should be maintained for test generation.

5. The method of claim 4, wherein evaluating the candidate test question using the QA system further comprises:
in response to the confidence measure being less than the threshold confidence measure, sending a notification to a user requesting user input indicating whether to maintain the candidate test question in the set of test questions;
receiving a user input in response to the notification; and
in response to the user input specifying that the candidate test question is to be maintained in the set of test questions, outputting an output result indicating that the candidate test question is to be maintained in the set of test questions.

6. The method of claim 1, wherein the candidate test question is generated from the potential test question answer based on applying at least one of templates or question generation rules to characteristics of the potential test question answer.

7. The method of claim 1, wherein ingesting the document further comprises processing the document using natural language processing (NLP) mechanisms to extract named entities and factual relationships between the named entities that are relevant to a domain of the corpus of documents, and wherein generating a candidate test question comprises generating a candidate test question for which at least one of a named entity or a factual relationship extracted by the NLP mechanisms is a correct answer.

8. The method of claim 1, wherein generating a candidate test question comprises generating the candidate test question and one or more variants of the candidate test question, wherein evaluating the candidate test question further comprises evaluating each of the one or more variants of the candidate test question to determine if any of the one or more variants should be maintained for test generation.

9. The method of claim 1, wherein evaluating the candidate test question using the QA system comprises determining that the candidate test question is malformed in response to the QA system being unable to parse the candidate test question to extract metadata information indicating portions of the candidate test question, and wherein the result of the evaluation is to not maintain the candidate test question in response to determining that the candidate test question is malformed.

10. The method of claim 1, further comprising:
selecting test questions from the set of test questions for inclusion in a test to be administered to a user; and
outputting the test to the user.

11. A computer program product comprising a computer readable storage medium having a computer readable program stored therein, wherein the computer readable program, when executed on a computing device, causes the computing device to:
ingest, by test question answer extraction engine logic executing on one or more processors of the computing device, a document from a corpus of documents to select a potential test question answer from the document;
generate, by test question generation engine logic executing on the one or more processors of the computing device, a candidate test question based on the potential test question answer;
evaluate, by a Question and Answer (QA) system, the candidate test question to generate a result indicative of whether the candidate test question should be maintained for test generation;
store the candidate test question in the set of test questions in response to a result indicating that the candidate test question should be maintained for test generation; and
transmit, by test generation engine logic executing on the one or more processors of the computing device, to at least one other computing device, the set of test questions to administer the test to at least one human test taker via the at least one other computing device.

12. The computer program product of claim 11, wherein the computer readable program causes the computing device to evaluate the candidate test question using the QA system at least by:
inputting the candidate test question to the QA system;
processing the candidate test question by the QA system to generate a candidate answer to the candidate test question;
determining if the candidate answer matches the potential test question answer; and
generating an output result based on the result of the determining.

13. The computer program product of claim 12, wherein the output result indicates that the candidate test question should be maintained for test generation in response to the candidate answer matching the potential test question answer.

14. The computer program product of claim 12, wherein the computer readable program further causes the computing device to evaluate the candidate test question using the QA system at least by:
in response to determining that the candidate answer matches the potential test question answer, determining if a confidence measure generated by the QA system for the candidate answer is equal to or greater than a threshold confidence measure; and
in response to the confidence measure being equal to or greater than the threshold confidence measure, generating the output result comprises outputting an output result indicating that the candidate test question should be maintained for test generation.

15. The computer program product of claim 14, wherein the computer readable program further causes the computing device to evaluate the candidate test question using the QA system at least by:
in response to the confidence measure being less than the threshold confidence measure, sending a notification to a user requesting user input indicating whether to maintain the candidate test question in the set of test questions;
receiving a user input in response to the notification; and
in response to the user input specifying that the candidate test question is to be maintained in the set of test questions, outputting an output result indicating that the candidate test question is to be maintained in the set of test questions.

16. The computer program product of claim 11, wherein the candidate test question is generated from the potential test question answer based on applying at least one of templates or question generation rules to characteristics of the potential test question answer.

17. The computer program product of claim 11, wherein the computer readable program further causes the computing device to ingest the document at least by processing the document using natural language processing (NLP) mechanisms to extract named entities and factual relationships between the named entities that are relevant to a domain of the corpus of documents, and wherein the computer readable program further causes the computing device to generate a candidate test question at least by generating a candidate test question for which at least one of a named entity or a factual relationship extracted by the NLP mechanisms is a correct answer.

18. The computer program product of claim 11, wherein the computer readable program further causes the computing device to generate a candidate test question at least by generating the candidate test question and one or more variants of the candidate test question, wherein the computer readable program further causes the computing device to evaluate the candidate test question at least by evaluating each of the one or more variants of the candidate test question to determine if any of the one or more variants should be maintained for test generation.

19. The computer program product of claim 11, wherein the computer readable program further causes the computing device to evaluate the candidate test question using the QA system at least by determining that the candidate test question is malformed in response to the QA system being unable to parse the candidate test question to extract metadata information indicating portions of the candidate test question, and wherein the result of the evaluation is to not maintain the candidate test question in response to determining that the candidate test question is malformed.

20. An apparatus comprising:
at least one processor; and
a memory coupled to the processor, wherein the memory comprises instructions which, when executed by the at least one processor, cause the at least one processor to:
ingest, by test question answer extraction engine logic executing on the at least one processor, a document from a corpus of documents to select a potential test question answer from the document;
generate, by test question generation engine logic executing on the at least one processor, a candidate test question based on the potential test question answer;
evaluate, by a Question and Answer (QA) system, the candidate test question to generate a result indicative of whether the candidate test question should be maintained for test generation;
store the candidate test question in the set of test questions in response to a result indicating that the candidate test question should be maintained for test generation; and
transmit, by test generation engine logic executing on the at least one processor, to at least one other computing device, the set of test questions to administer the test to at least one human test taker via the at least one other computing device.

\* \* \* \* \*